United States Patent [19]

Hamon et al.

[11] Patent Number: 4,910,004

[45] Date of Patent: Mar. 20, 1990

[54] PROCESS FOR SELECTIVE REDUCTION OF NITROGEN OXIDES CONTAINED IN OXYGENATED GASEOUS EFFLUENTS

[75] Inventors: Christian Hamon; Yannick Le Goff, both of Saint-Nazaire, France

[73] Assignee: Azote et Societe Chimique de la Grande Paroisse, Produits Chemiques, Paris, France

[21] Appl. No.: 177,461

[22] Filed: Apr. 4, 1988

[30] Foreign Application Priority Data

Apr. 3, 1987 [FR] France ............................... 87 04718
Oct. 28, 1987 [FR] France ............................... 87 14911

[51] Int. Cl.$^4$ .......................... B01J 8/00; C01B 21/00
[52] U.S. Cl. ..................................... 423/239; 423/235
[58] Field of Search ................... 423/239, 239 A, 235, 423/235 D

[56] References Cited

U.S. PATENT DOCUMENTS

| | | | |
|---|---|---|---|
| 3,689,212 | 9/1972 | Petit et al. | 423/239 |
| 3,895,094 | 7/1975 | Carter et al. | 423/239 |
| 4,052,337 | 10/1977 | Nishikawa et al. | 252/455 Z |
| 4,220,632 | 9/1980 | Pence et al. | 423/329 |
| 4,473,535 | 9/1984 | Kittrell et al. | 423/239 |

FOREIGN PATENT DOCUMENTS

| | | |
|---|---|---|
| 0141917 | 5/1985 | European Pat. Off. . |
| 0196965 | 8/1986 | European Pat. Off. . |
| 2411853 | 9/1974 | Fed. Rep. of Germany . |
| 3642018 | 6/1987 | Fed. Rep. of Germany . |
| 1556708 | 2/1969 | France . |
| 2197815 | 3/1974 | France . |

OTHER PUBLICATIONS

Patent Abstracts of Japan, vol. 11, No. 326 (C-454)(2773), Oct. 23, 1987, and JP-A-62 114 657 (Babcock Hitachi K.K.) 26-05-1987.
Chemical Abstracts, vol. 84, No. 22, May 31, 1976, p. 319, No. 151159s.
Chemie-Ingenieur-Technik, vol. 55, No. 2, Feb., 1983, pp. 148–149.
Chemical Abstracts, vol. 87, No. 2, 11 Juillet 1972, p. 325, résumé No. 10890a, Columbus, Ohio, U.S.; and JP-A-76 81 777 (Toray Industries Inc.) 17-07-1976.
Chemical Abstracts, vol. 104, No. 2, 13 Janvier 1986, p. 273, résumé No. 10010h, Columbus, Ohio, U.S.; and JP-A-60 147 220 (Babcock-Hitachi K.K.) 03-08-1985.
Chemical Abstracts, vol. 96, No. 20, 17 Mai 1982, p. 549, résumé No. 170679c, Columbus, Ohio, U.S.; P. M. Hirsch: "Selected Conversion of Nitrogen Oxide Ammonia", & Environ. Prog. 1982 1(1), 24–9.

Primary Examiner—Gregory A. Heller
Attorney, Agent, or Firm—Browdy and Neimark

[57] ABSTRACT

A catalytic composition for selective reduction of nitrogen oxides comprising, as active material, mordenite in ammonium or acid form, with a residual sodium content less than 1000 ppmw, representing 70 to 95% of the total weight of the catalytic composition, the remainder comprising a binder. The active material can also be in the form of small-pore mordenite exchanged with copper ions.

The catalytic composition can be used for the purification of effluents with containing any nitrogen oxide, in particular for depolluting residual gases rejected into the atmosphere during the production of nitric acid.

2 Claims, No Drawings

PROCESS FOR SELECTIVE REDUCTION OF NITROGEN OXIDES CONTAINED IN OXYGENATED GASEOUS EFFLUENTS

FIELD OF THE INVENTION

This invention relates to purification of oxygenated gaseous effluents polluted by nitrogen oxides.

BACKGROUND OF THE INVENTION

Residual gases coming from production of nitric acid, apparatus for pickling of metals with acids, thermal decomposition of nitrates, etc. contain a high concentration of nitrogen oxides $NO_2$, which are polluting compounds because of their corrosive action and the contamination of the air that they cause.

To combat industrial pollution it is necessary to have means for eliminating toxic wastes, including nitrogen oxides produced in combustions of any origin.

It has been known for seveal decades, especially from the teaching of German patent No. 1,088,938, that oxygen is eliminated during catalytic reduction of nitrogen oxides with fuels. With this process, fuel consumption is high and the great amount of released heat causes an accelerated degradation of the catalyst and a loss of its activity.

It has been proposed to subject the oxygenated gaseous effluents containing nitrogen oxides to a selective reaction with ammonia, the presence of oxygen not interfering with this type of reduction. According to French patent 1,205,311, this reaction is catalyzed by metals of the platinum group or metals of the iron group according to French patent 1,233,712. However, these catalysts as described, after a certain period of use, undergo, in the presence of ammonia and nitrogen dioxide $NO_2$, a change involving a reduction of their catalytic efficiency.

Further, it is known to submit the oxygenated gaseous effluents containing nitrogen oxides to a selective reduction in the presence of vanadium pentoxide deposited on alumina, especially from French patent 1,412,713. However, catalysts comprising a transition metal oxide as an active component do not promote the reduction of nitrous oxide ($N_2O$).

In the technical field of purification of gaseous effluents polluted by nitrogen oxides, by selective reduction of said oxides with ammonia leading to the production of nonpolluting nitrogen and water products, French patent 2,413,128 describes catalytic compositions containing as active elements, iron and chromium in the form of oxides associated with alumina and at least one promoter selected from rare earth oxides alone or in combination and rare metals accompanying platinum ores. These catalysts are applicable with satisfactory results in a purification process at a temperaure between 120° and 350° C.

It was desirable to extend the zone of using the process of reduction of nitrogen oxides to the higher temperatures. Actually, in many cases the effluents to be treated had a temperature greater than 300° C.; and it was advisable to avoid resorting to heat exchangers to cool then heat the gases to achieve a gain in investment and a saving in operation.

Further, the fact of performing the selective reduction by ammonia at higher temperature makes possible the purification of effluents containing, besides nitrogen oxides, sulfur oxides; these latter do not combine, at this temperature level, with ammonia to form ammonium sulfate which causes a deactivation of the catalyst.

French application 2,568,789 proposed a reduction process, denitrification of ammonia of residual gases in the presence of a zeolite of the type of substitution with hydrogen and/or iron, at a surface velocity of 5 m/h or less with a ratio of the ammonia $NH_3$ concentration to the nitrogen dioxide $NO_2$ concentration of 1.3 or more, in particular 1.6 or more.

The catalyst, seeming to have been tested only on a laboratory scale, was prepared by immersion of a natural or synthetic zeolite in hydrochloric acid, an aqueous solution of ferric chloride or an aqueous solution of ferric nitrate $Fe(NO_3)_3$, then calcination at about 500° C. The tests were conducted in the presence of mordenite with substitution with H, Fe obtained by replacing 42% of equivalent of Na, K and Ca contained in the mordenite with hydrogen and 35% of equivalent for iron.

A resistant catalyst was sought making it possible to obtain equivalent purification performances in extensive fields of application and at all nitrogen oxides contents, by using a lower $NH_3/NO_x$ ratio, while performing the reaction of reduction of nitrogen oxides at high temperature and at volumetric speeds of circulation of gases which can be high.

SUMMARY OF THE INVENTION

According to the present invention, the catalytic compositions for selective reduction of nitrogen oxides contained in the oxygenated gaseous effluents, by ammonia, contain, as active material, mordenite in ammonium or acid form with a residual sodium content less than 1000 ppmw (parts per million by weight) in a proportion between 70 and 95% of the total weight of the catalytic composition, the complement comprising a binder.

The basic mordenite is in sodium form and its catalytic activity is very slight in the reduction of nitrogen oxides by ammonia. Preparation of the catalytic compounds of the invention resort to techniques of exchange of the mordenite.

The exchange of sodium ions $Na^+$ with ammonium ions $NH_4^+$ is performed by treatment of the sodium mordenite with a solution of ammonium nitrate in a stirred reactor. The rate of exchange is limited by thermodynamics, and the speed of reaction is a function of the temperature of the medium. In the case of mordenite, the reaction is very rapid, in particular, at a temperature close to 100° C., the thermodynamic equilibrium is reached in less than 10 minutes. The exchange treatment is performed during a period slightly greater than 10 minutes at a temperature on the order of 100° C. Obtaining a very low sodium content implies an elimination of the extracted sodium to shift the thermodynamic equilibrium.

After the ion exchange phase, the mordenite is partially separated by filtering, then subjected to a washing operation with demineralized water.

Then the partially exchanged mordenite is subjected to a second exchange treatment with an ammonia nitrate solution, under the same conditions as above, followed by a separation by filtering and washing with demineralized water.

It has been found that two cycles each corresponding to a sequence—exchange-filtering-washing—are sufficient to lower the sodium content below 1000 parts per million by weight.

The product obtained is then subjected to drying at a temperature on the order of 120° C. for a period of 10 to 20 hours, after which it is subjected for several hours to an operation of mixing with a binder.

The binder used is an element of the group consisting of kaolinite clay ($Si_2Al_2O_5(OH)_4$), bentonite, alumina, alone or in combination.

The catalytic composition obtained is packaged in a suitable form, such as pellets, or preferably extrudates.

Then drying is performed for several hours at a temperature between 100° and 120° C.

Then to obtain the acid mordenite, the product obtained after the previous drying is subjected to a heat treatment under a strong flow of dry air, at a minimum of 1 to 2 $Nm^3h^{-1}/l$ of catalyst, in a crosswise bed, with progressive raising of the temperature of 50° to 100° C./h to a temperature between 450° to 550° C., maintaining this temperature level for 5 to 10 hours.

The specific surface measured according to the BET method, nitrogen adsorption at the temperature of liquid nitrogen—of catalytic compositions in acid form is between 200 and 300 $m^2/g$ and the diameter of macropores—measured on a mercury porosimeter—between 40 and 15,00 Å essentially.

The catalytic compositions of the invention are applicable with great success in a process of purification, in the presence of ammonia, of oxygenated gaseous effluents containing nitrogen oxides ($NO_x$) at a temperature between 300° and 550° C., under a pressure of at least 0.1 MPa absolute, with an hourly volume velocity HVV of circulation of gases, which can be brought up to 80,000 $h^{-1}$, and a ratio of the ammonia concentration to the nitrogen oxide concentration $NH_3/NO_x$ at most equal to 1.25.

The purification process can be performed in the presence of a mordenite according to the invention in ammonium form in a temperature zone of 300° to 375° C., or in acid form in a zone of 300° to 550° C.

Increase of pressure has a favorable influence on the activity of the purification catalysts, also the process of reduction of nitrogen oxides is advantageously performed at the highest pressure possible; very satisfactory results are obtained for pressures between 0.15 MPa and 1 MPa.

The process of reduction of nitrogen oxides in the presence of catalytic compositions with a base of ammonium or acid mordenite with a residual sodium content of less than 1000 ppmw, leads to quite remarkable purification efficiencies and yields with slight amounts of ammonia added to the oxygenated effluent to be treated relative to the content of said effluent in nitrogen oxides. It is possible to obtain very satisfactory results with ratios expressed in moles $NH_3$/moles $NO_x$ between 1.05 and 1.2; a ratio of 1.1 can be advantageously selected.

According to a variation of the present invention in the catalytic composition comprising, as an active material, exchanged mordenite representing 70 to 95% of the total weight of said composition rounded out by a binder, the mordenite is exchanged with copper ions.

The mordenite used is the so-called industrially synthesized "small-pore" variety. This form is called small-pore in contrast with the "large-pore" form which is also synthetic. In both cases, the same structure is involved, but with different adsorption properties. The large-pore form adsorbs benzene (kinetic diameter 6.6 $10^{-10}$ m, whereas the small-pore form adsorbs only molecules with kinetic diameter less than about 4.4 $10^{-10}$ m. These two types of zeolites are also distinguished by morphological differences. The small-pore type mordenite cystallizes as needles, whereas the large-pore type mordenite crystallizes as spherulites.

The small-pore mordenite, of elementary formula $Na_7((AlO_2)_7(SiO_2)_{40})$, $24H_2O$, shows an Si/Al ratio measured by fluorescence X of about 6; the sodium content which results from this Si/Al structure ratio is close to 5.2% by weight (relative to the dry product 1000° C.). The volume of the crystalline lattice (orthorhombic system) is close to 2770 $Å^3$.

This small-pore mordenite is synthesized in its sodium form and its catalytic activity, in this form, like those of other sodium zeolites, is very slight.

It has been found that substitution by exchange of sodium ions totally or partially with copper ions makes it possible to obtain a very high-performance catalyst for catalytic reduction with ammonia of nitrogen oxides contained in the oxygenated gaseous effluents.

This catalytic composition contains as active material, a so-called small-pore mordenite adsorbing only molecules with a kinetic diameter less than about 4.4·$10^{-10}$ m, and crystallizes as needles, exchanged with copper cations, representing between 1 and 5% of the total weight of said composition, the complement being made up by a binder.

The presence of copper in the active exchanged mordenite, in the form complexed by ammonia $Cu(NH_3)_4^{2+}$, was found to be very advantageous.

The binder used is an element of the group consisting of kaolinite clay ($Si_2Al_2O_5(OH)_4$), bentonite, alumina, alone or in combination.

The catalytic compositions are packaged in a suitable form, such as pellets or extrudates.

These catalytic compositions can be obtained directly from the sodium form without prior transformation to the ammonium or acid form; however, it has been found that the catalytic activity is reinforced if the ammonium form is selected as starting product.

Copper cations are introduced by exchange with sodium $Na^+$ or ammonium $NH_4^+$ ions. This exchange reaction can be performed on the zeolite in the form of powder or on it after shaping with a suitable binder.

When the starting product consists of small-pore mordenite, in powder, in sodium or ammonium form, it is subjected to at least two cation exchange cycles by being put in contact with a copper tetramine solution at a temperature between 20° and 80° C., preferably 40° to 60° C., followed by separation of the exchanged mordenite by filtering and washing with demineralized water, then drying at controlled temperature to obtain the separation of water under the gentlest conditions possible, then the resulting material is mixed with a suitable binder, and the catalytic composition is shaped.

When the exchange reaction is used on the packaged product, the small-pore mordenite powder in sodium or ammonium form is mixed with a suitable binder, after adjustment of the moisture, shaping and drying. The preshaped products are subjected to a heat treatment between 300° and 500° C., said preforms are then subjected to at least one cation exchange treatment by being put in contact with a copper tetramine solution, at a temperature between 20° and 80° C., preferably 40° to 60° C., followed by separation by filtering, washing with demineralized water, then drying of the catalytic composition at controlled temperature to obtain separation of water under the gentlest conditions possible.

Introduction of copper cations in its form complexed by ammonia $Cu(NH_3)_4^{2+}$ is achieved by means of a solution of copper tetramine, resulting from the reaction of copper nitrate and ammonia.

The rate of exchange between sodium $Na^+$ and ammonium $NH_4^+$ ions with copper cations $Cu^{++}$ can be increased either by multiplying the number of exchange cycles or by raising the temperature of this exchange.

It has been found that the exchange of small-pore mordenite with copper ions $Cu^{++}$ leads to obtaining very remarkable catalysts.

The catalytic compositions can be used for purification, in the presence of ammonia, of oxygenated gaseous effluents contaning nitrogen oxides $(NO)_x$, at a temperature between 225° and 400° C., under pressure of at 0.1 MPa absolute with an hourly volume velocity HVV of circulation of gases, which can be raised and reach 80,000 $h^{-1}$, and a ratio of ammonia concentration to nitrogen oxides concentration $NH_3/NO_x$ at most equal to 1.25.

Excellent yields are obtained in this type of purification, with molar ratios $NH_3/NO_x$ between 1.05 and 1.2; a ratio of 1.15 can advantageously be chosen.

The influence of the pressure is comparable to that observed with ammonium mordenite without copper cations.

The advantage of copper exchanged catalytic compositions resides in the performance of the purification operation at low temperature. Very satisfactory results are obtained at 250° C., whereas it is necessary to operate above 300° C. with preceding other catalysts.

The copper exchanged catalytic compositions make it possible to combine very high purification yields greater than 98% with amounts of ammonia very close to stoichiometry and especially very slight contents of residual ammonia after reaction, which represents an undeniable advantage for this type of catalyst.

The purification process used on the catalytic compositions of the invention are particularly well suited for depollution of residual gas rejected into the atmosphere in the production of nitric acid.

The process is extremely flexible, suited to purification of gaseous effluents with any nitrogen oxide contents, even in the presence of sulfur oxides. The efficiency of the process is remarkable even at high $NO_x$ contents on the order of 20000 ppm and also at slight nitrogen oxide contents on the order of 100 ppmv.

These catalytic compositions are resistant industrial products which do not undergo any mechanical deterioration or loss of activity after very long periods of operation.

DETAILED DESCRIPTION OF THE INVENTION

Examples are given below of the preparation of the catalytic composition and its use, which illustrate the invention in a nonlimiting way.

EXAMPLE 1

Preparation of Catalyst No. 1

Into a reactor with 150 liters of useful volume are introduced 100 liters of ammonium nitrate solution at 300 grams per liter, and 25 kg, figured in dry material, of small-pore sodium mordenite, of the elementary formula $Na_7((AlO_2)_7(SiO_2)_{40})$, $24H_2O$, and with an initial sodium content of 5.9% by weight of dry product.

The suspension is stirred for 15 minutes at 100° C. The mordenite is recovered by filtering on a band filter of 0.1 $m^2$ of filtering surface and washed on the filter with 100 liters of demineralized water. At the filter output, the water content of the drained mass is 55% by weight. The sodium content, relative to dry material, of the mordenite is 4000 ppmw.

The drained mass is picked up and retreated under the same ion exchange and filtering conditions. After washing with 300 liters of demineralized water to eliminate all the extracted sodium, the product is dried at 120° C. in an oven for 10 hours. A very pulverulent powder is obtained whose residual sodium content is 900 ppmw of dry material.

Then, the powder is mixed for four hours with a binder made up of 75% by weight of kaolinite clay and 25% by weight of bentonite, at a rate of 20% by weight, of dry material, relative to the total weight.

The mixture obtained is subjected to extrusion, and the extrudates of 4.8 millimeters in diameter are subjected to drying at 120° C. for 3 hours.

EXAMPLE 2

This example illustrates use of catalyst No. 1 in ammonium form, under various operating conditions, by using residual gases of an industrial nitric acid unit. The results are given in table I below.

The process of reduction by ammonia of nitrogen oxides contained in residual gases is performed under a pressure varying from 0.17 to 0.6 MPa absolute, at an average temperature of the catalytic bed of 325° C.; the hourly volume velocity HVV expresses the delivery of gas entering on the catalyst in Nl/h divided by the volume of the catalyst.

The content of nitrogen oxides $NO_x$ is expressed in ppmv (parts per million by volume); the $NO_x$ content of the gases at the input of the catalyst, expressed in ppmv, is carried in column 1 of the table; the reduction yield, expressed in %, corresponding to the ratio of the difference between $NO_x$ content of the gases as input and the $NO_x$ content of gaes as output, to the $NO_2$ content of gases as input, is carried in column 6. The amount of ammonia added to the incoming gas expressed in moles $NH_3$/moles $NO_x$ appears in column 5. The hourly volume velocity HVV is carried in column 4, pressure P in MPa absolutes in column 3 and the average temperature of the catalyst T in °C. in column 2.

TABLE 1

| $NO_x$ input ppmv | average T °C. | P abs MPa | HVV $h^{-1}$ | $NH_3$ $NO_x$ | Yield % |
|---|---|---|---|---|---|
| 1 500 | 325 | 0.17 | 5000 | 1.1 | 98.2 |
| " | " | 0.17 | 15000 | 1.1 | 92.9 |
| " | " | 0.3 | 10000 | 1.1 | 98.2 |
| " | " | 0.3 | 20000 | 1.1 | 95.8 |
| " | " | 0.45 | 45000 | 1.1 | 91.1 |
| " | " | 0.45 | 95000 | 1.1 | 94.4 |
| " | " | 0.6 | 95000 | 1.1 | 96.8 |
| " | " | 0.6 | 40000 | 1.1 | 95.1 |
| " | " | 0.6 | 60000 | 1.1 | 90.5 |
| 3500 | 325 | 0.25 | 5000 | 1.1 | 98.4 |
| " | " | " | 7500 | " | 98.1 |
| " | " | " | 10000 | " | 97.1 |
| " | " | " | 19500 | " | 95.5 |
| " | " | " | 15000 | " | 93.2 |

EXAMPLE 3

A sample of catalyst No. 1 is charged in a test reactor, then subjected to a heat treatment under dry air (in crosswise fixed bed) at an hourly velocity HVV of 20,000 $h^{-1}$ with progressive raising of the temperature from 75° C. per hour to 500° C. and this temperature level is kept during 10 hours.

The specific surface, measured according to the BET method, of catalyst No. 2 in acid form is 240 m$^2$/g, its microporous volume 0.285 cm$^3$/g with a distribution of the diameter of the pores between 40 and 5000 A (for 98.9% of the microporous volume) and its microporous volume, determined by nitrogen adsorption, is 0.25 cm$^3$/g.

As in the preceding example, catalyst No. 2 is used under various operating conditions, using residual gases of an industrial nitric acid unit.

The process of reduction by ammonia of the nitrogen oxides contained in the residual gas is performed under a pressure varying from 0.17 to 0.6 MPa absolute, at an average temperature of the catalytic bed of 450° C.

The results given in Table II below were obtained after more than six months of operation of catalyst No. 2.

TABLE II

| $NO_x$ input ppmv | average: T °C. | P abs MPa | HVV h$^{-1}$ | $NH_3$ $NO_x$ | Yield % |
|---|---|---|---|---|---|
| 1500 | 450 | 0.17 | 3000 | 1.1 | 98.2 |
| " | " | 0.17 | 15000 | 1.1 | 95.3 |
| " | " | 0.3 | 10000 | 1.1 | 98.7 |
| " | " | 0.3 | 20000 | 1.1 | 97.7 |
| " | " | 0.45 | 15000 | 1.1 | 98.7 |
| " | " | 0.45 | 25000 | 1.1 | 98.2 |
| " | " | 0.45 | 40000 | 1.1 | 96.8 |
| " | " | 0.6 | 25000 | 1.1 | 98.8 |
| " | " | 0.6 | 40000 | 1.1 | 97.9 |
| " | " | 0.6 | 60000 | 1.1 | 93.1 |

EXAMPLE 4

Preparation of Catalysts Numbers 3, 4, 5 and 6

The powder is used which was obtained during production of catalyst No. 1. The powder is then mixed for 4 hours with a binder, at a rate of 20% by weight of dry material relative to the total weight.

The composition of the binder is the following:
catalyst No. 3 kaolinite clay 100% by weight
catalyst No. 4 kaolinite clay 40% by weight—bentonite 60% by weight
catalyst No. 5 bentonite 100 by weight
catalyst No. 6 Condea alumina 100% by weight Shaping and heat treatment are the same as for catalyst No. 2.

The main characteristics of catalytic compositions Nos. 3 to 6 are given in Table III below.

TABLE III

| Catalyst | Specific surface m$^2$g$^{-1}$ BET method | Macroporous volume (m$^3$g$^{-1}$) | Diameter of macropores A | % Macroporous volume between 40 and 1500 A |
|---|---|---|---|---|
| 3 | 260 | 0.334 | 37.5–15000 | 98.0 |
| 4 | 250 | 0.252 | 37.5–30000 | 95.9 |
| 5 | 283 | 0.265 | 37.5–40000 | 89.1 |
| 6 | 238 | 0.303 | 37.5–37500 | 98.7 |

EXAMPLE 5

This example illustrates the use of catalysts Nos. 3, 4, 5 and 6 under two operating conditions, using residual gases of an industrial nitric acid unit, as in example 2. The results are given in table IV below:

TABLE IV

| Catalyst | $NO_x$ input ppmv | average T °C. | Pabs MPa | HVV h$^{-1}$ | $NH_3$ $NO_x$ | Yield % |
|---|---|---|---|---|---|---|
| 3 | 1500 | 450 | 0.45 | 45000 | 1.1 | 98.9 |
|  | " | " | " | 25000 | 1.1 | 95.4 |
| 4 | 1500 | 450 | 0.45 | 15000 | 1.1 | 97.7 |
|  | " | " | " | 25000 | 1.1 | 97.0 |
| 5 | 1500 | 450 | 0.45 | 45000 | 1.1 | 98.2 |
|  | " | " | " | 25000 | 1.1 | 93.5 |
| 6 | 1500 | 450 | 0.45 | 15000 | 1.1 | 98.0 |
|  | " | " | " | 25000 | 1.1 | 95.8 |

EXAMPLE 6

Catalyst No. 7

6.6 kg of small-pore sodium mordenite, characterized above, is intimately mixed with 1.9 kg of alumina gel. The losses to firing at 1000° C. of these products are 9.7 and 20.7% respectively.

The mixture thus obtained after adjustment of the moisture is shaped by extrusion through a die.

In this case the equipment is of the gear type and the extrudates have a diameter of 3 mm for an average length of 8 mm. The mordenite content is 80% (dry material). The rods are dried in an oven at 60° C. for 3 hours, then at 120° C. for 3 hours. They are then treated in a muffle furnace in plates at 350° C. for 2 hours.

The strength of these extrudates measured on rolls is between 1.1 and 1.6 kg/mm. 150 cm$^3$ extrudates of sodium mordenite are placed in a stainless steel basket (mesh 2/10 mm) whose geometry is adjusted to that of a 0.5-liter beaker. Their charging density is close to 0.65.

500 cm$^3$ of a copper tetramine solution is prepared from 70 g of crystallized Cu(NO$_3$)$_2$ 6H$_2$O dissolved in 100 cm$^3$ of demineralized water by addition of 250 cm$^3$ of ammonia concentrated at 25% NH$_3$. First, the formation of a copper hydroxide precipitate is observed which, after agitation, disappears. The solution is clear blue. The copper is complexed by NH$_3$ in the form Cu(NH$_3$)$_4{}^{2+}$. It is rounded out with demineralized water to have a solution volume of 0.5 liter.

The stainlss steel basket containing the extrudates is placed in a 0.5-liter beaker. 250 cm$^3$ of cupric solution is poured in. Its level is above that of the extrudates. The unit is brought to 40° C. and the exchange reaction is maintained for 2 hous. The basket is then removed; the extrudates are washed by soaking in demineralized water and the exchange operation is performed again with 200 cm$^3$ of fresh cupric solution. The product is washed 3 times by soaking then dried in an oven at 60° C. for 3 hours, then at 120° C. for 2 hours.

The copper content of the extrudates is 3% (of dry product) which represents, considering a content of Al$_2$O$_3$ binder of 20%, an exchange rate of the sodium of 53%.

The exchange rate can be increased either by increasing the number of exchanges or the reaction temperature.

EXAMPLE 7

Catalyst No. 8

150 g of small-pore sodium mordenite is introduced in the form of powder (PAF: 9.7%) in a 500 cm$^3$ beaker containing 300 cm$^3$ of copper tetramine solution prepared according to the procedure described in example 6.

The suspension is stirred with a bar magnet and the temperature is adjusted to 40° C. The exchange period is 2 hours.

The mordenite partially exchanged with Cu++ is recovered by filtering with a filtering funnel and washed with 1 liter of demineralized water.

A second exchange is performed under the same conditions. The product after filtering and washing is dried at 60° C. for 2 hours, then at 120° C. for 2 hours.

This product is intimately mixed with a binder consisting of 75% kaolinite clay and 25% bentonite. The mordenite content of the product (dry) is 80%. This powder is then shaped in pellets with a diameter of 3 mm.

The rate of exchange of sodium with copper is 48%.

EXAMPLE 8

Catalyst No. 9

6.9 kg of small-pore mordenite in ammonium form is used according to the preparation described above.

The sodium content is close to 400 ppm and the loss to firing (PAF) at 1000° C. is 13%.

The product is intimately mixed with 1.9 kg of alumina gel (PAF: 20.7%) then extruded through a die 3 mm in diameter. The mordenite content is 80% by weight. The exchange as described in example 6 is reproduced.

The copper content is 3% which represents an exchange rate of 53%.

EXAMPLE 9

This example illustrates the use of the catalysts prepared according to the procedures described in the three preceding examples tested on a fixed bed, in a catalytic unit, under various operating conditions; the gaseous effluent to be treated comes directly from an industrial nitric acid unit.

The volume of catalyst used is 37.5 cm$^3$, which is brought to 350° C. under a gas current rich in nitrogen (96% $N_2$-4% $O_2$) of 750 Nl/h at a rate of rise in temperature of 100° C./h. The mixture ($N_2$-$O_2$) is then replaced by the effluent to be treated which is mixed with an amount of ammonia which is a function of the content of the nitrogen oxides. The reduction process is performed under a pressure varying from 0.104 to 0.45 MPa absolute. The hourly volume velocity (HVV) expresses the delivery of gas entering on the catalyst Nl/h divided by the volume of the catalyst (l). The $NO_x$ content is expressed in ppmv (parts by million by volume). It is 1500 ppm for the group of tests made whose results are presented below.

The amount of ammonia added to the entering gas is expressed by the molar ratio $NH_3/NO_x$. The residual ammonia content after the reaction is expressed in ppm. The temperature indicated is the average temperature of the catalytic bed. The reduction yield, expressed in %, corresponds to the ratio of the difference between the content of $NO_x$ of the gases as input and the content of $NO_x$ of the gases as output, to the $NO_x$ content of the gases as input.

TABLE V

| | CATALYST No. 7: $NO_x$ input: 1500 ppm | | | | |
|---|---|---|---|---|---|
| Average T °C. | Pabs MPa | HVV h$^{-1}$ | $NH_3/NO_x$ | Yield % | $NH_3$ output ppmv |
| 350 | 0.104 | 5000 | 1.15 | 99.7 | 0 |
| " | " | 10000 | 1.18 | 98.4 | 0 |
| " | " | 15000 | 1.15 | 94 | 0 |

TABLE V-continued

| | CATALYST No. 7: $NO_x$ input: 1500 ppm | | | | |
|---|---|---|---|---|---|
| Average T °C. | Pabs MPa | HVV h$^{-1}$ | $NH_3/NO_x$ | Yield % | $NH_3$ output ppmv |
| " | 0.3 | 15000 | 1.16 | 98.5 | 0 |
| " | " | 25000 | 1.15 | 97.5 | 0 |
| " | " | 35000 | 1.16 | 94.5 | 2 |
| " | " | 40000 | 1.15 | 91.6 | 6 |
| " | 0.45 | 20000 | 1.16 | 99 | 0 |
| " | " | 30000 | 1.15 | 98 | 0 |
| " | " | 40000 | 1.15 | 96.1 | 0 |
| " | " | 50000 | 1.15 | 93.6 | 13 |
| 300 | 0.104 | 5000 | 1.17 | 98.8 | 0 |
| " | " | 10000 | 1.14 | 96.8 | 0 |
| " | " | 15000 | 1.14 | 80 | 0 |
| " | 0.3 | 15000 | 1.17 | 97.9 | 0 |
| " | " | 25000 | 1.15 | 93.9 | 3 |
| " | " | 30000 | 1.15 | 89.6 | 4 |
| " | 0.45 | 15000 | 1.16 | 98.7 | 0 |
| " | " | 25000 | " | 97.4 | 0 |
| " | " | 35000 | " | 94 | 2 |
| " | " | 45000 | " | 90 | 3 |

TABLE VI

| | CATALYST No. 8: $NO_x$ input: 1500 ppmv | | | | |
|---|---|---|---|---|---|
| Average T °C. | Pabs MPa | HVV h$^{-1}$ | $NH_3/NO_x$ | Yield % | $NH_3$ output ppmv |
| 350 | 0.104 | 10000 | 1.18 | 98.8 | 0 |
| " | " | 20000 | 1.14 | 94 | 0 |
| " | " | 25000 | 1.14 | 91.5 | 0 |
| " | 0.3 | 15000 | 1.18 | 99 | 0 |
| " | " | 25000 | 1.14 | 98 | 0 |
| " | " | 35000 | 1.15 | 94.2 | 0 |
| " | " | 40000 | 1.14 | 89.8 | 7 |
| " | 0.45 | 15000 | 1.16 | 99.2 | 0 |
| " | " | 35000 | 1.16 | 91.8 | 1 |
| " | " | 50000 | 1.16 | 95.1 | 5 |
| " | " | 60000 | 1.16 | 93 | 6 |
| 300 | 0.104 | 10000 | 1.14 | 97.8 | 0 |
| " | " | 15000 | 1.15 | 95.2 | 0 |
| " | " | 20000 | 1.16 | 92 | 6 |
| " | 0.3 | 15000 | 1.15 | 98.2 | 6 |
| " | " | 25000 | 1.14 | 94.4 | 15 |
| " | " | 30000 | 1.16 | 91 | 23 |
| " | 0.45 | 15000 | 1.43 | 99 | 0 |
| " | " | 35000 | 1.15 | 91.4 | 80 |
| " | " | 50000 | 1.15 | 94 | 25 |
| " | " | 60000 | 1.16 | 91.9 | 10 |

TABLE VII

| | CATALYST No. 9: $NO_x$ input: 1500 ppmv | | | | |
|---|---|---|---|---|---|
| Average T °C. | Pabs MPa | HVV h$^{-1}$ | $NH_3NO_x$ | Yield % | $NH_3$ output ppmv |
| 350 | 0.45 | 15000 | 1.16 | 99.4 | 0 |
| " | " | 35000 | 1.14 | 99 | 0 |
| " | " | 50000 | 1.14 | 98.6 | 0 |
| " | " | 60000 | 1.13 | 97.1 | 0 |
| 250 | 0.45 | 10000 | 1.15 | 98.8 | 0 |
| " | " | 20000 | 1.16 | 96.4 | 0 |
| " | " | 25000 | 1.15 | 92.9 | 0 |

While the invention is described above in relation to certain specific embodiments, it will be understood that many variations are possible, and that alternative materials and reagents can be used without departing from the invention. In some cases such variations and substitutions may require some experimentation, but such will only involve routine testing.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for purification, in the presence of ammonia, of oxygenated gaseous effluents containing nitrogen oxides, in the presence of a catalytic composition comprising mordenite, wherein the mordenite is in ammonium or acid form having a residual sodium content of less than 1000 ppmw wherein said mordenite is a small-pure mordenite which adsorbs only molecules with a kinetic diameter less than about $4.4 \times 10^{-10}$ m, the purification performed at temperatures ranging from 300°–500° C., the mordenite composition comprising from 70% to 95% of the total weight of the catalyst, the remainder being a binder.

2. A process for purification, in the presence of ammonia, of oxygenated gaseous effluents containing nitrogen oxides, comprising contacting said gaseous effluents at a temperature between 225° and 400° C., under a pressure of at least 0.1 MPa absolute, with an hourly volume velocity of circulation of gases of up to 80,000 $h^{-1}$, and a ratio of the concentration of ammonia to the concentration of nitrogen oxides $NH_3/NO_x$ is not greater than 1.25, with a catalytic composition comprising exchanged mordenite, said exchanged mordenite comprising from 70% to 95% of the total weight of the catalytic composition, the remainder of said catalytic composition comprising a binder;

wherein said mordenite is a small-pore mordenite which adsorbs only molecules with a kinetic diameter less than about $4.4 \times 10_{-10}$ m, said mordenite crystallizing as needles, exchanged with copper ions, and representing from 1 to 5% by weight of the total weight of the catalytic composition.

* * * * *